(No Model.) 2 Sheets—Sheet 1.
J. SILICEO, Jr.
GALVANIC BATTERY.
No. 429,703. Patented June 10, 1890.
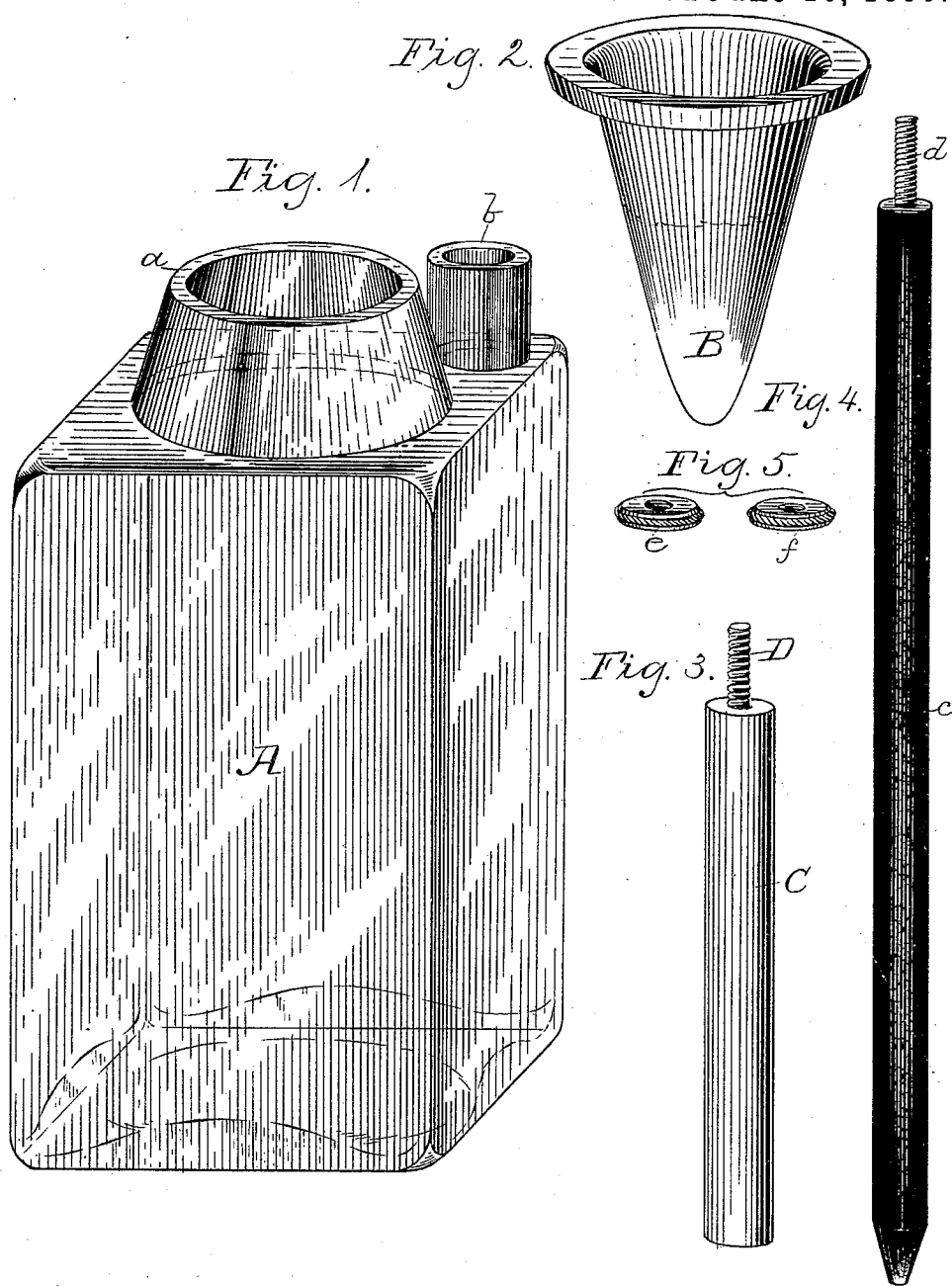
Witnesses.
J. W. Hoke.
N. B. Anderson.
Inventor.
José Siliceo, Jr.
by Frank D. Thomason
Atty (No Model.) 2 Sheets—Sheet 2.
J. SILICEO, Jr.
GALVANIC BATTERY.
No. 429,703. Patented June 10, 1890.
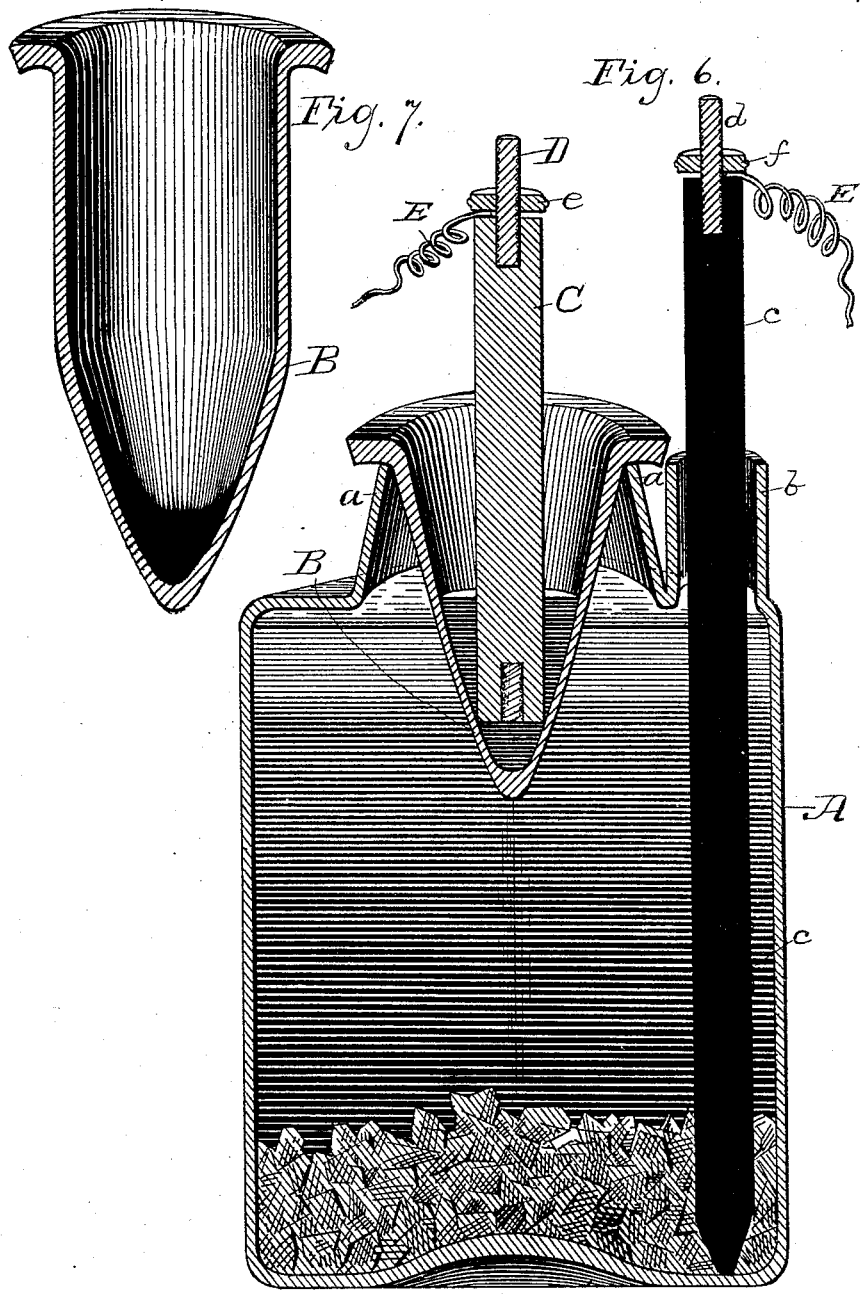
Witnesses.
J. W. Hoke.
N. B. Anderson.
Inventor.
José Siliceo Jr.
by Frank D. Thomason

UNITED STATES PATENT OFFICE.

JOSÉ SILICEO, JR., OF MEXICO, MEXICO.

GALVANIC BATTERY.

SPECIFICATION forming part of Letters Patent No. 429,703, dated June 10, 1890.

Application filed February 19, 1887. Renewed April 7, 1890. Serial No. 346,823. (No model.) Patented in Mexico December 29, 1884.

*To all whom it may concern:*

Be it known that I, JOSÉ SILICEO, Jr., residing in the city of Mexico, in the Mexican Republic, have invented certain new and useful Improvements in Electric Batteries, (for which I applied for and obtained Letters Patent from the Mexican Republic December 29, 1884,) of which the following is a full, clear, and exact description, reference being had to the drawings and letters of reference marked thereon.

Galvanic batteries have heretofore been made so that the porous cup and glass jar are on the same level, and the concentrated solution of salts, that are necessary for depolarizing the negative electrode, (positive pole, carbon,) percolates through the porous cup and consumes rapidly the positive electrode, (negative pole, zinc,) shortening the period of its efficacy.

The object of my invention is to so construct the battery as to have the solution very concentrated at the negative electrode, where it is useful, and as weak as possible at the positive electrode, so that the minimum of zinc is consumed and the chemicals employed last much longer.

The chemicals that I use in the battery are the bichromates of potash or soda and sulphuric acid, to be put in the glass jar, and mercury in the porous cup, and water in both, so that the specific gravity of chromic acid produced by the bichromate and sulphuric acid insures a more perfect concentration at the bottom of the glass jar, and a purer but weaker solution at the top to percolate through the porous cup and consume the zinc.

In the drawings, Figure 1 is a perspective view of the cell or jar. Fig. 2 is a perspective view of the porous cup. Fig. 3 is a perspective view of the zinc. Fig. 4 is a perspective view of the carbon. Fig. 5 is a detail view. Fig. 6 is a vertical transverse section of the battery, and Fig. 7 is a vertical transverse section of the porous cup.

Reference being had to the drawings, A represents a cylindrical or rectangular shaped jar having a neck arising from its mouth, and provided with a smaller opening $b$ in the shoulder beside said neck $a$.

B represents a cup made of porous earthenware, which has the upper portion of its sides covered with varnish, paraffine, or other suitable material to fill the pores thereof. This cup preferably tapers at the bottom, and has a flange projecting laterally from its mouth, and is of such diameter that it can be set into the mouth of jar A, so that the flange thereof rests upon and is supported by the upper edge of neck $a$. (When the jar is charged, the porous cup is immersed in the solution.)

I charge the jar with bichromate of potash, sulphuric acid, and water sufficient to leave only one inch empty space in the jar, and insert down through the opening $b$ a carbon prism $c$, similar to those used in electric-light apparatuses until it rests upon the bottom of the jar A. In the cup I place a prism of zinc C, Figs. 3 and 6, and then pour in sufficient mercury to cover the lower end of the zinc, (about two ounces.)

The conical shape of the lower end of the cup B enables me to use the smallest possible quantity of mercury, and, moreover, permits the zinc C, as it is consumed, to gravitate down into and conform to the shape of the bottom of the cup.

For convenience in making the connection, I tap the upper end of both the carbon and zinc and screw into them the screws $d$ and D, respectively. With these screws engage the binding-nuts $c$ and $f$, between which and the zinc and carbon, respectively, are clamped the wires E.

In order to enable me to use the entire prism of zinc, I prefer to tap both ends thereof, (see Fig. 6,) so that two sections can thus be connected by a screw-plug D and be entirely consumed. It makes no difference whether the cup is conical-shaped at the bottom or not. I prefer the conical shape, however, because it requires less mercury, and I construct the jar as shown to reduce waste by evaporation to a minimum.

If the cup were suspended in any other way than that shown, the hole for the insertion of the carbon might be dispensed with. As it is, however, it is prevented by accident from approaching nearer the zinc.

What I claim as new is—

1. In an electric battery, the combination, with a jar, of a porous cup having a conical-shaped bottom, substantially as and for the purpose set forth.

2. In an electric battery, the combination, with a jar A, having a neck $a$ and a hole $b$ beside said neck, of a porous cup B, having a lateral flange projecting from its neck, so that its flange rests upon and is supported by the upper edge of said neck, as hereinbefore specified.

3. The combination, in an electric battery, with a jar A, having a neck $a$, a hole $b$, and a cup B, adapted to enter and be supported in said neck, as described, of the carbon and zinc prisms adapted to enter said jar and cup, respectively, and provided with screws and nuts, as and for the purpose set forth.

4. In an electric battery, a zinc made in sections, having their ends tapped longitudinally and provided with a screw for connecting them.

JOSÉ SILICEO, Jr.

In presence of—
 FRANCO. G. PORCHICO,
 FRANK D. THOMASON.